United States Patent
Baccouche et al.

(10) Patent No.: US 9,211,917 B1
(45) Date of Patent: Dec. 15, 2015

(54) REAR SUB-FRAME SLEEVE FOR PROTECTING A FUEL TANK

(71) Applicant: Ford Global Technologies, LLC, Dearborn, MI (US)

(72) Inventors: Mohamed Ridha Baccouche, Ann Arbor, MI (US); Rahul Arora, Royal Oak, MI (US); Sino Johan Van Dyk, Plymouth, MI (US); Saied Nusier, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/471,144

(22) Filed: Aug. 28, 2014

(51) Int. Cl.
*B60N 99/00* (2006.01)
*B62D 25/20* (2006.01)
*B60K 15/00* (2006.01)

(52) U.S. Cl.
CPC ............ *B62D 25/2027* (2013.01); *B60K 15/00* (2013.01)

(58) Field of Classification Search
CPC .......................... B62D 25/2027; B60K 15/00
See application file for complete search history.

(56) References Cited

U.S. PATENT DOCUMENTS

| 8,007,034 B2 * | 8/2011 | Kobayakawa ... B60K 15/03504 296/193.08 |
| 2006/0289224 A1 | 12/2006 | Ono et al. |
| 2009/0195030 A1 * | 8/2009 | Yamaguchi .......... B62D 21/152 296/193.08 |
| 2013/0181485 A1 | 7/2013 | Rumpel et al. |

FOREIGN PATENT DOCUMENTS

| CN | 103523100 A | 1/2014 |
| JP | 5391397 B2 | 1/2014 |

* cited by examiner

*Primary Examiner* — Lori L Lyjak
(74) *Attorney, Agent, or Firm* — Jason Rogers; Brooks Kushman P.C.

(57) ABSTRACT

A sleeve is attached to a tubular longitudinal bar that extends around a control arm for the rear suspension of a vehicle. The tubular longitudinal bar is generally U-shaped with a first leg attached to a frame rail in front of the control arm and a second leg connected to the frame rail behind the control arm. The first and second legs are joined by a middle portion. A bend is formed between the first leg and the middle portion. The tubular sleeve is attached to the tubular longitudinal bar at the bend and extends partially along the first leg and the middle portion. The tubular sleeve is disposed between the control arm and a fuel tank of a vehicle that is located between the rear wheels of the vehicle.

9 Claims, 2 Drawing Sheets

REAR SUB-FRAME SLEEVE FOR PROTECTING A FUEL TANK

TECHNICAL FIELD

This disclosure relates to a protective structure for a fuel tank that is disposed within a sub-frame located between the rear wheels of a vehicle.

BACKGROUND

Hybrid vehicles that have dual electric/combustion drive systems present challenges relating to packaging the components of both systems in the space available in the vehicle structure. Electric drive systems require substantial space for batteries and electric motor components. Combustion systems require substantial space for the engine and fuel tank. Batteries and fuel tanks are generally located in interior locations spaced from the perimeter of the vehicle to satisfy test requirements. Availability of protective interior locations for batteries and fuel tanks is limited.

One proposed solution to providing space for the batteries of a hybrid vehicle is to locate the battery in front of the rear sub-frame. To accommodate this battery location, the fuel tank is moved from a location in front of a crossbar of a rear sub-frame that includes a front and rear cross member connected by longitudinal side bars and is placed between the rear wheels and rear suspension components. The front cross member was eliminated to enable the fuel tank to be moved to a more rearward location between the rear wheels. Elimination of the front cross member resulted in excessive deformation in the sub-frame and fuel tank strain in the 50 MPH 70% offset Moving Deformable Barrier (MDB) rear impact test.

One possible solution to the problem of excessive deformation was to increase the thickness of the walls of the longitudinal side bars but this was unacceptable because it would result in a considerable increase in the weight of the vehicle. Another proposed solution was to locally reinforce the longitudinal side bars with patches of metal made of the same material as the longitudinal side bars in localized areas to avoid excessive added weight but his approach failed to eliminate the excessive deformation of the longitudinal side bars. Reinforcing an internal radius of a bend resulted in excessive splitting of a corresponding external radius. Reinforcing the external radius resulted in excessive bending of the corresponding internal radius.

This disclosure is directed to providing a solution to the above problems and other problems as summarized below.

SUMMARY

According to one aspect of this disclosure, a rear sub-frame for a motor vehicle is provided that comprises a cross member, a pair of tubular U-shaped bars and a tubular sleeve. The cross-member is attached between two frame rails and disposed behind a fuel tank. The pair of U-shaped bars are each connected to one of the frame rails in front of and in back of a control arm. The U-shaped bars are partially disposed between the fuel tank and the control arm. The tubular sleeve is provided on each U-shaped bar between the fuel tank and the control arm.

According to other aspects of this disclosure, the tubular sleeve may be a two-part clam shell assembly that is assembled to the U-shaped bars. Alternatively, the U-shaped bars may have a first wall thickness and the tubular sleeve may be an area integrally provided on the U-shaped bars having a second wall thickness that is greater than the first wall thickness.

The U-shaped bars each may have a first leg extending from a first connection point to the frame rails in front of the control arm to a front bend that joins a longitudinally extending middle portion that is disposed between the fuel tank. The control arm also may have a second leg extending from a second connection point to the frame rails behind the control arm to a rear bend that joins the middle portion. The tubular sleeve may be J-shaped and provided at the front bend of the U-shaped bars.

According to another aspect of this disclosure, a rear sub-frame is disclosed for a vehicle having a fuel tank, a control arm and a frame rail. The sub-frame may comprise a tubular support bar and a reinforcement sleeve. The tubular support bar has a first leg extending from a first connection point on the frame rail in front of the control arm to a front bend that joins a longitudinally extending middle portion. The middle portion is disposed between the fuel tank and the control arm. A second leg of the tubular support bar extends from a second connection point to the frame rail behind the control arm to a rear bend that joins the middle portion. The reinforcement sleeve extends around the front bend of the tubular support bar.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
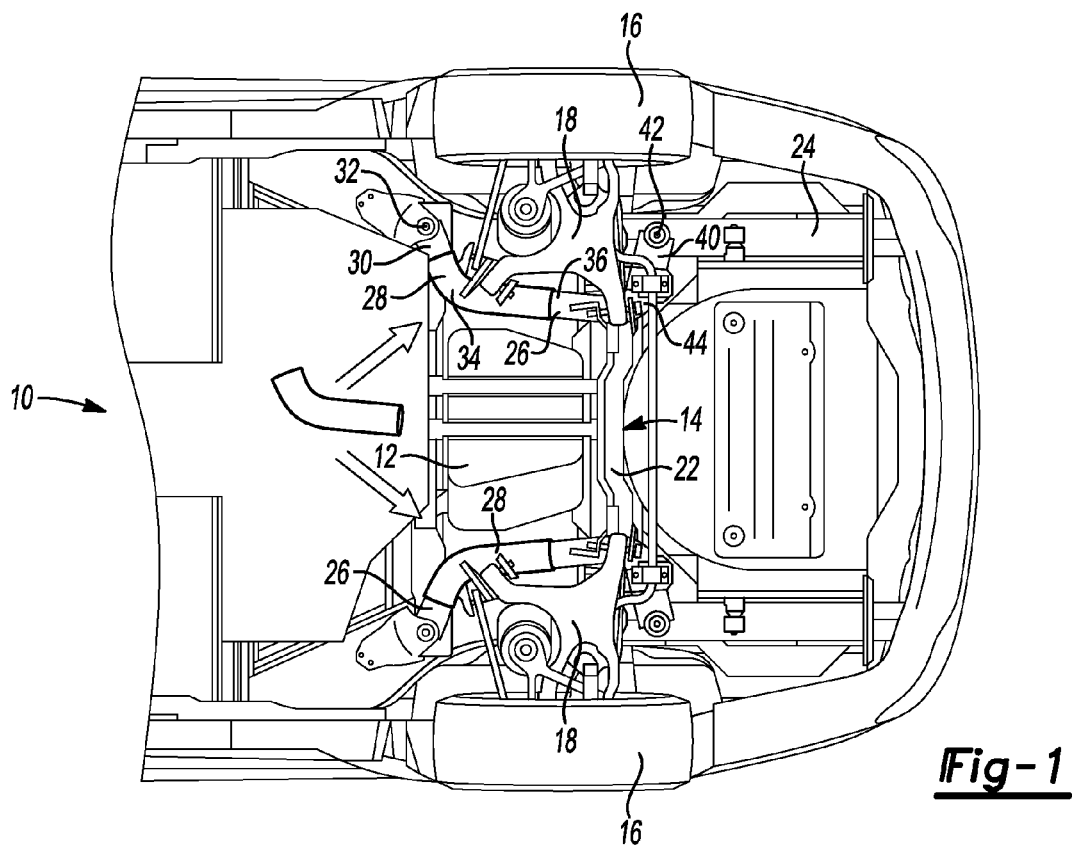
FIG. 1 is a fragmentary bottom plan view of a vehicle with a fuel tank disposed between the rear wheels that have a rear sub-frame sleeve on a U-shaped tubular longitudinal bar.
Figure 2:
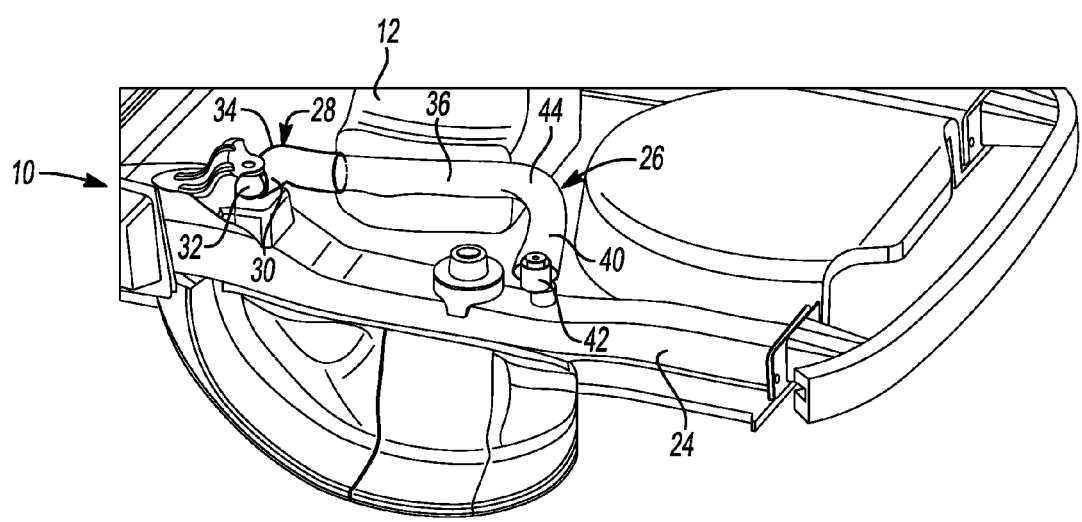
FIG. 2 is a fragmentary bottom perspective view of a vehicle with a fuel tank disposed between the rear wheels that have a rear sub-frame sleeve on a U-shaped tubular longitudinal bar.

Referring to FIGS. 1 and 2, a vehicle is partially illustrated from below to illustrate the rear end of the vehicle. The vehicle 10 illustrated is a plug-in hybrid electric vehicle (PHEV). While the illustrated vehicle is a PHEV, it should be understood that this disclosure may be beneficial on other types of vehicles, particularly vehicles that have a fuel tank 12 that is disposed within a rear suspension assembly 14. The fuel tank 12, as illustrated, is disposed between the wheels 16 (including tires) of the vehicle 10.

The rear suspension assembly 14 includes a control arm 18 that controls the suspension of the wheels 16 on the vehicle 10. The control arm 18 includes a bushing and bracket assembly 20. The rear suspension assembly 14 also includes a rear cross member 22 that extends between the wheels 16 and is connected to the frame rails 24 of the vehicle 10.

A U-shaped tubular longitudinal bar 26 is provided that extends around the control arm 18 associated with each of the wheels 16. A J-shaped tubular sleeve 28 is provided on the U-shaped tubular longitudinal bar 26.

The U-shaped tubular longitudinal bar 26 has a first leg 30 that extends from a first connection point 32 on the frame rails 24 to a front bend 34. The front bend 34 is provided between the first connection leg 30 and a middle portion 36. The middle portion 36 of the U-shaped tubular longitudinal bar 26 extends generally in a longitudinal direction to a second leg 40 of the U-shaped tubular longitudinal bar 26. The second leg 40 is connected to the frame rail 24 at a second connection point 42. A rear bend 44 is formed where the second leg 40 joins the middle portion 36. The first leg 30, middle portion 36 and second leg 40 form the U-shaped longitudinal bar 26.

The J-shaped tubular sleeve 28 is either assembled to or integrally formed on the U-shaped tubular longitudinal bar 26. The J-shaped tubular sleeve 28 reinforces the first leg 30 at the front bend 34 and extends to a limited extent along the length of the middle portion 36.

The tubular sleeve may be formed of aluminum, steel or composites. The U-shaped tubular longitudinal bar 26 may also be formed of either aluminum or steel. The thickness of the aluminum sleeve may be approximately 2 to 3 mm and the thickness of the longitudinal bar 26 may be 2.5 mm in one embodiment. Note, if the entire longitudinal bar 26 were formed of a thicker material, such as a 5 mm thick tubing, the excess weight added to the vehicle would be a disadvantage and unacceptable.

Figure 3:
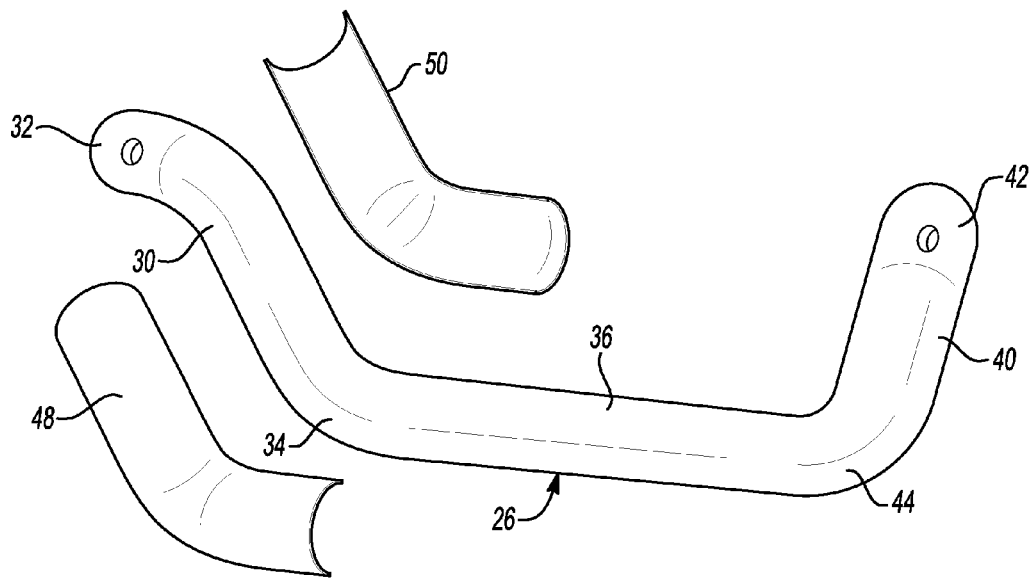
FIG. 3 is an exploded perspective view of a U-shaped tubular longitudinal bar with a clam shell sub-frame sleeve.

Referring to FIG. 3, the U-shaped tubular longitudinal bar 26 is shown in isolation from the rest of the vehicle. The longitudinal bar 26 includes the first leg 30 that includes the first connection point 32 on one end and extends to a front bend 34 where the first leg 30 is formed with the middle portion 36. The second leg 40 terminates at the second connection point 42 and extends to the middle portion 36 where it is joined at the rear bend 44. A first clam shell part 48 and a second clam shell part 50 make up the J-shaped tubular sleeve 28 and are shown in an exploded view separated from the longitudinal bar 26. The clam shell parts 48 and 50 may be formed in a sheet metal forming process and then welded to the longitudinal bar 26 and each other in an assembly operation.

Figure 4:
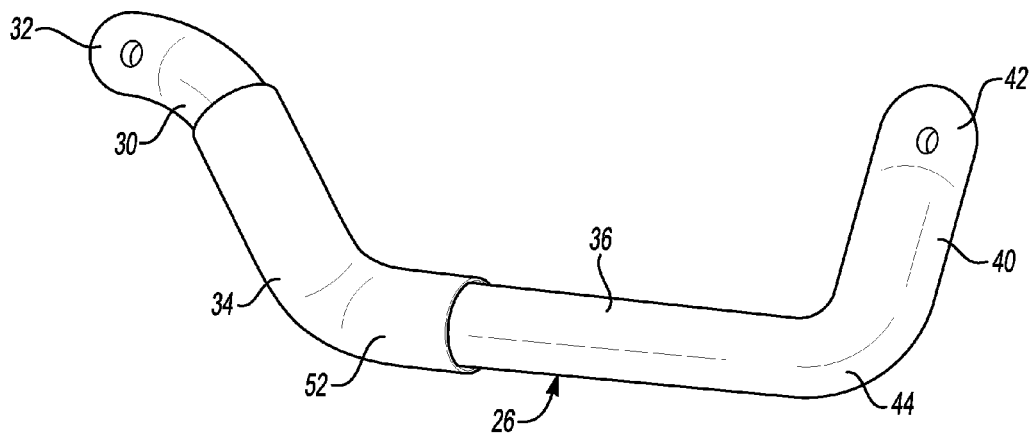
FIG. 4 is a perspective view of a U-shaped tubular longitudinal bar with an integral sub-frame sleeve.

Referring to FIG. 4, the longitudinal bar 26 including the first leg 30, middle portion 36 and second leg 40 as previously described with reference to FIG. 3, includes an integrally formed tubular sleeve 52. The integrally formed tubular sleeve 52 is secured at the same location as the embodiment of FIG. 3 so that it reinforces the first leg 30, front bend 34 and middle portion 36. The integrally formed tubular sleeve 52 may be formed as a tailor welded blank that may be hydroformed to shape. Alternatively, the integrally formed tubular sleeve may be formed by telescopically inserting a straight sleeve blank into or over a straight tubular bar blank. The sleeve blank is telescopically assembled to the tubular bar blank and may then be formed by a bending operation or in a hydro-forming operation into the U-shaped tubular longitudinal bar 26 and J-shaped tubular sleeve 28.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A rear sub-frame comprising:
   a cross-member attached between two frame rails and disposed behind a fuel tank;
   a pair of U-shaped bars each connected to one of the frame rails in front of and in back of a control arm, wherein the U-shaped bars are partially disposed between the fuel tank and the control arm; and
   a tubular sleeve provided on each U-shaped bar between the fuel tank and the control arm.

2. The rear sub-frame of claim 1 wherein the tubular sleeve is a two-part clam shell assembly that is assembled to the U-shaped bars.

3. The rear sub-frame of claim 1 wherein the U-shaped bars have a first wall thickness and the tubular sleeve is an area integrally provided on the U-shaped bars having a second wall thickness that is greater than the first wall thickness.

4. The rear sub-frame of claim 1 wherein the U-shaped bars each have a first leg extending from a first connection point to the frame rails in front of the control arm to a front bend that joins a longitudinally extending middle portion disposed between the fuel tank and the control arm and a second leg extending from a second connection point to the frame rails behind the control arm to a rear bend that joins the middle portion.

5. The rear sub-frame of claim 4 wherein the tubular sleeve is J-shaped and is provided at the front bend of the U-shaped bars.

6. A rear sub-frame for a vehicle having a fuel tank, a control arm and a frame rail, the sub-frame comprising:
   a tubular support bar having a first leg extending from a first connection point on the frame rail in front of the control arm to a front bend that joins a longitudinally extending middle portion disposed between the fuel tank and the control arm and a second leg extending from a second connection point to the frame rail behind the control arm to a rear bend that joins the middle portion; and
   a reinforcement sleeve extending around the front bend of the tubular support bar.

7. The rear sub-frame of claim 6 wherein the reinforcement is a two-part clam shell assembly that is assembled to the front bend.

8. The rear sub-frame of claim 6 wherein the tubular support bar has a first wall thickness and the reinforcement is an area integrally provided on the tubular support bar having a second wall thickness that is greater than the first wall thickness.

9. The rear sub-frame of claim 6 wherein the reinforcement is a J-shaped tubular sleeve and the tubular support bar is a U-shaped member, and wherein the J-shaped tubular sleeve is provided at the front bend of the U-shaped member.

* * * * *